United States Patent
Babala et al.

(10) Patent No.: US 7,424,347 B2
(45) Date of Patent: Sep. 9, 2008

(54) MOTION SENSORS INTEGRATED WITHIN AN ELECTRO-HYDRAULIC CONTROL UNIT

(75) Inventors: Michael L. Babala, Plymouth, MI (US);
Marc Bolitho, Linden, MI (US);
Gordon Thomas, Livonia, MI (US);
Doug Lewin, Cement City, MI (US);
Helmut Gegalski, Mühlheim-Kärlich (DE); Burkard Bustgens, Neuwied (DE); Nicodemus Kappen, Merxheim (DE); Thomas Barron, Leimbach (DE)

(73) Assignee: Kelsey-Hayes Company, Livonia, MI (US)

( * ) Notice: Subject to any disclaimer, the term of this patent is extended or adjusted under 35 U.S.C. 154(b) by 891 days.

(21) Appl. No.: 10/758,945

(22) Filed: Jan. 16, 2004

(65) Prior Publication Data
US 2004/0163470 A1 Aug. 26, 2004

Related U.S. Application Data

(63) Continuation-in-part of application No. PCT/US02/23134, filed on Jul. 19, 2002.

(60) Provisional application No. 60/352,605, filed on Jan. 29, 2002, provisional application No. 60/306,622, filed on Jul. 19, 2001.

(51) Int. Cl.
*H05K 1/18* (2006.01)
*G01P 15/18* (2006.01)

(52) U.S. Cl. ............................... 701/1; 701/36; 701/70; 73/514.02

(58) Field of Classification Search ............... None
See application file for complete search history.

(56) References Cited

U.S. PATENT DOCUMENTS

| 5,737,188 | A | 4/1998 | Flierl et al. |
| 5,950,973 | A | 9/1999 | Verma |
| 5,982,049 | A * | 11/1999 | Jakob et al. ............... 307/10.1 |
| 6,146,139 | A | 11/2000 | Harrison, III |
| 6,195,261 | B1 | 2/2001 | Babutzka et al. |
| 6,215,672 | B1 * | 4/2001 | Warner et al. ............... 361/785 |
| 6,264,289 | B1 | 7/2001 | Franke et al. |
| 6,532,419 | B1 * | 3/2003 | Begin et al. ................. 701/220 |
| 2004/0163470 | A1 | 8/2004 | Babala et al. |

FOREIGN PATENT DOCUMENTS

| DE | 100 41 206 | | 3/2002 |
| DE | 101 07 550 | | 9/2002 |
| DE | 101 07 949 | | 9/2002 |
| EP | 0 908 363 | | 4/1999 |
| JP | 06-156296 | | 6/1994 |
| JP | 07-234126 | | 9/1995 |
| JP | 11-044756 | | 2/1999 |
| WO | WO 98/43470 | * | 10/1998 |
| WO | WO 02/16179 | | 2/2002 |
| WO | WO 03/008244 | | 1/2003 |

* cited by examiner

*Primary Examiner*—Michael J. Zanelli
(74) *Attorney, Agent, or Firm*—MacMillan, Sobanski & Todd, LLC

(57) ABSTRACT

An electronic control unit for a vehicle system that includes at least one acceleration sensor and at least one angular rate sensor for generating data concerning motion of the vehicle relative to vehicle reference axes.

39 Claims, 11 Drawing Sheets

MOTION SENSORS INTEGRATED WITHIN AN ELECTRO-HYDRAULIC CONTROL UNIT

CROSS REFERENCE TO RELATED APPLICATIONS

This application is a continuation-in-part of co-pending International patent application No. PCT/US02/23134 filed on Jul. 19, 2002, and claims the benefit of U.S. Provisional patent application Nos. 60/306,622 and 60/352,605 filed on Jul. 19, 2001, and Jan. 29, 2002, respectively. International patent application No. PCT/US02/23134 was published as WO 03/008244 on Jan. 30, 2003, in English under PCT Article 21(2)

BACKGROUND OF THE INVENTION

This invention relates in general to Electronic Control Units for controlling a vehicle brake system and in particular to integration of vehicle motion sensors into an Electronic Control Unit.

Many vehicles being currently produced by automotive manufacturers include automatic brake control systems that are integrated with their hydraulic brake systems. Such systems include Anti-lock Brake Systems (ABS) that prevent wheel lock-up during braking cycles, Vehicle Stability Control (VSC) systems that assist in preventing loss of directional control of a vehicle during vehicle maneuvers and Traction Control (TC) systems to prevent slippage of driven wheels on low mu surfaces, as encountered with icy road surfaces. Additionally, such systems also assist in preventing loss of directional control when the vehicle is operated upon normal or even high mu surfaces, as can occur during accident avoidance maneuvers.

An automatic brake control system typically includes an electro-hydraulic control unit that is integrated with the brake lines of the hydraulic brake system.

Referring now to the drawings, there is shown in FIG. 1, a typical electro-hydraulic control unit 10 for an automatic brake control system. The electro-hydraulic control unit 10 typically includes an Electronic Control Unit (ECU) 12 which is mounted upon a hydraulic valve body 14. The hydraulic valve body 14 is connected to the vehicle hydraulic brake system. The ECU 12 includes a microprocessor and control algorithm for operating the brake system. A plurality of solenoid valves are disposed within the hydraulic valve body 14. The solenoid valves can include normally open isolation valves and normally closed dump valves. The ECU 12 is connected to the solenoid valve coils and one or more wheel speed sensors (not shown). A pump 16 also is mounted upon the hydraulic valve body 14 to supply pressurized brake fluid to the brake control system. The operation of the pump is controlled by the ECU microprocessor.

Typically, the ECU 12 is removable from the hydraulic valve body 14 to allow servicing of the unit. Usually, a faulty ECU 12 will be simply swapped for an operational unit to allow the vehicle to be quickly returned to service. The faulty ECU can then be either repaired at the service facility or returned to the manufacturer. Accordingly, the solenoid valve coils that are connected to the ECU 12 are removable with the ECU from the solenoid valves disposed within the hydraulic valve body 14. The valves and hydraulic valve body 14 form a sealed hydraulic system with the vehicle brake system so that it is not necessary to bleed the vehicle brakes following removal and replacement of the ECU 12.

During vehicle operation, the ECU microprocessor continuously receives speed signals from the wheel speed sensors. When the microprocessor senses an impending vehicle control problem, the brake control system is activated. The ECU microprocessor starts the pump to supply pressurized brake fluid and causes the solenoid valves to cyclically apply and relieve hydraulic pressure to the wheel brakes to improve vehicle stability control.

The brake control system also can include motion sensors that supply vehicle motion data to the microprocessor. The motion sensors can include one or more acceleration sensors for measuring acceleration and/or deceleration of the vehicle. The acceleration is usually sensed relative to one or more of three orthogonal vehicle reference axes, which are commonly referred to the lateral, transverse and vertical axes. The motion sensors also can include one or more angular rate, or gyroscopic, sensors, that measure vehicle yaw, roll or pitch about the vehicle's reference axes.

SUMMARY OF THE INVENTION

This invention relates to integration of vehicle motion sensors into the Electronic Control Unit for a brake control system.

As described above, it is known to include acceleration sensors and angular rate sensors in brake control systems. However, the sensors are typically located separately from the electronic control unit. Usually, the ECU is mounted upon the valve body and the valve body is typically located in either the vehicle engine compartment on upon the vehicle chassis to facilitate connection to the hydraulic brake lines. The motion sensors, on the other hand, are typically located in the passenger compartment, at or near the vehicle's center of gravity. Accordingly, it is necessary to route wiring from the engine compartment to the passenger compartment to connect the motion sensors to the microprocessor in the ECU. Additionally, it is necessary to trouble shoot components in two separate locations when servicing is needed. Therefore, it would be desirable to mount the motion sensors within the ECU and thereby eliminate the wiring between the engine and passenger compartments. Alternately, it would be desirable to mount the motion sensors within an ECU that is located in the passenger compartment to simplify servicing of the control system.

The present invention is directed toward mounting vehicle motion sensors within the ECU. The invention contemplates a control unit for a vehicle system, the vehicle having a plurality of reference axes. The control unit includes a control unit housing adapted to be mounted upon the vehicle. A circuit substrate is mounted within the housing, the circuit substrate carrying electronic components for controlling the vehicle system. At least one motion sensor is mounted within the housing and electrically connected to the electronic components for controlling the vehicle system. The motion sensor is operative to generate data concerning motion of the vehicle relative to the reference axes and to transmit the motion data to the electronic components.

In the preferred embodiment, a plurality of motion sensors are mounted within the control unit housing, the motion sensors being electrically connected to the electronic components for controlling the vehicle system. The motion sensors operative to generate data concerning motion of the vehicle relative to the reference axes and to transmit said motion data to the electronic components. In the preferred embodiment, the vehicle reference axes are perpendicular to one another and each motion sensor generates date relative to an associated vehicle reference axis; however, the invention also may be practiced with non-perpendicular reverence axes and/or a motion sensor generating data relative to more than one reference axis. It also is contemplated that, in the preferred embodiment, the plurality of motion sensors include at least one accelerometer and at least one angular rate sensor; however, the invention also can be practiced with only acceleration sensors or only angular rate sensors mounted within the housing.

In the preferred embodiment, the electronic control unit is mounted upon a hydraulic valve body to form an electro-hydraulic control unit. The electro-hydraulic control unit is mounted either within the vehicle engine compartment or upon the vehicle chassis and the hydraulic valve body is connected to the vehicle hydraulic brake system. Such an electro-hydraulic unit can be included in either a conventional hydraulic brake system or in an electro-hydraulic brake system. However, the invention also contemplates mounting the electronic control unit, to include the motion sensors, at a location remote from the hydraulic valve body, such as, for example within the passenger compartment. Such a remotely located electronic control unit could be utilized with a brake by wire system or electric brake system. Additionally, the motion sensors also could be mounted in the electronic control unit for another system, such as, for example, an electric parking brake. The sensors would then be electrically connected through a CAN bus to the brake system electronic control unit.

In the preferred embodiment, two acceleration sensors and one angular rate sensor are mounted in the electronic control unit; however, the invention also can be practiced with more acceleration sensors and angular rate sensors mounted in the electronic control unit. For example, three acceleration sensors for measuring vehicle acceleration and deceleration relative to three vehicle reference axes and three angular rate sensors for measuring vehicle yaw, roll and pitch can be included in the ECU.

Various objects and advantages of this invention will become apparent to those skilled in the art from the following detailed description of the preferred embodiment, when read in light of the accompanying drawings.

DETAILED DESCRIPTION

Figure 1:
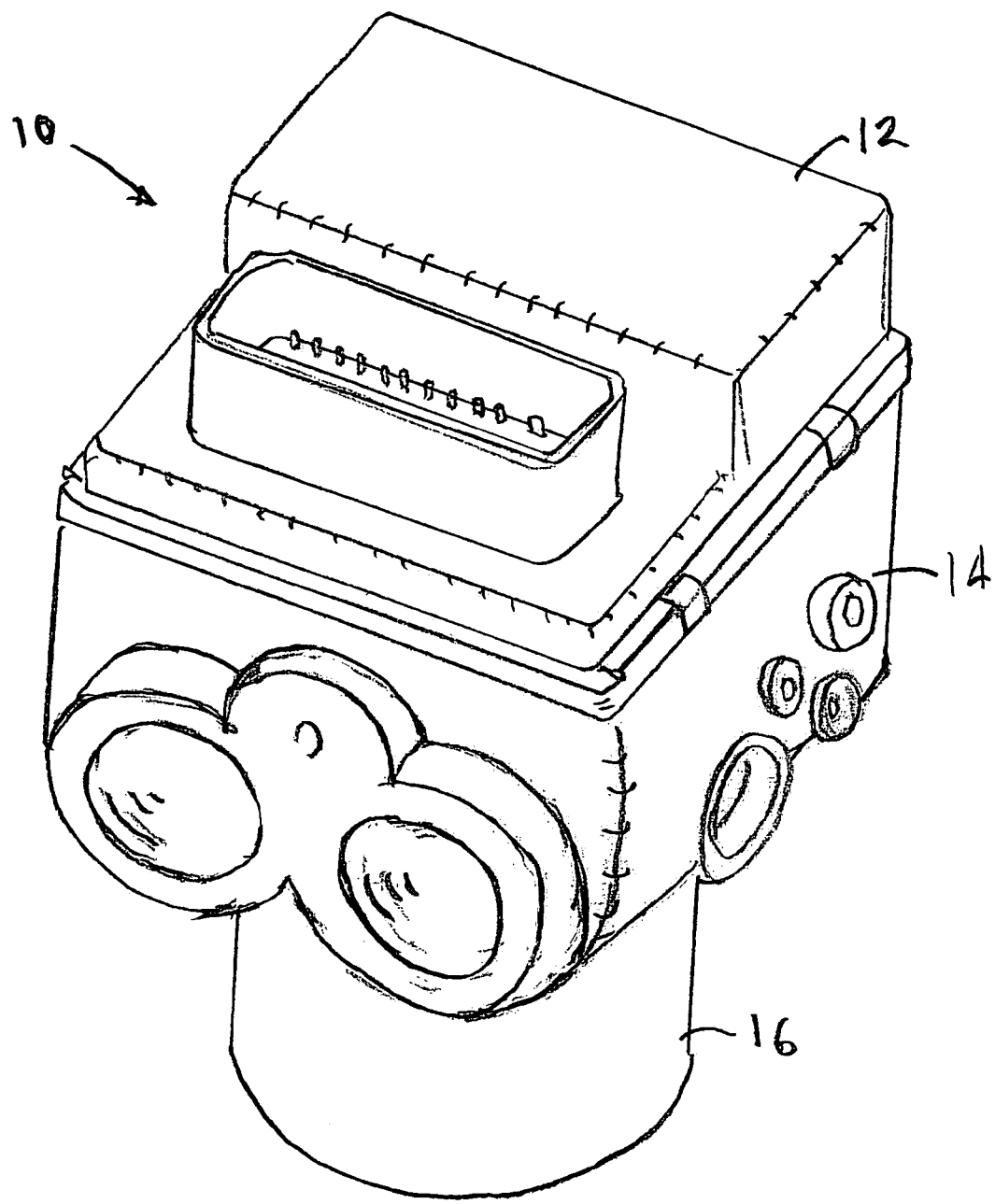
FIG. 1 is a perspective view of a prior art electro-hydraulic control unit for a vehicle brake system.
Figure 2:
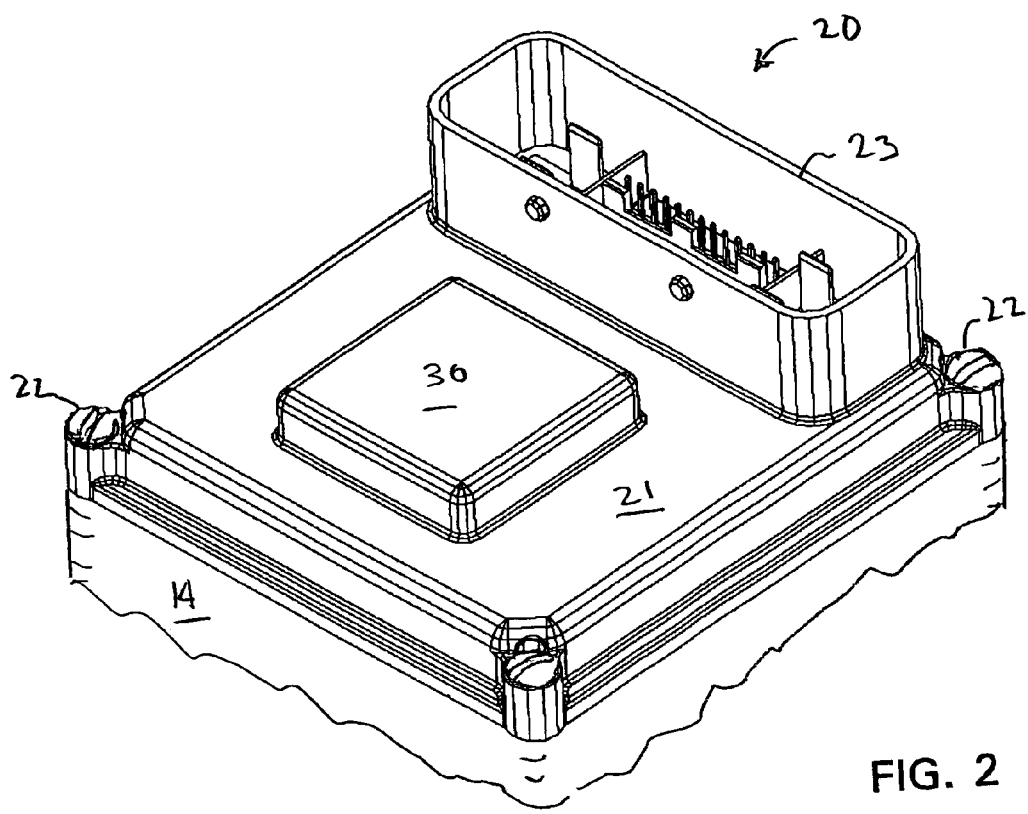
FIG. 2 is a perspective top view of an electronic control unit that includes vehicle motion sensors in accordance with the invention.

Referring again to the drawings, there is illustrated in FIG. 2, an ECU 20 in accordance with the invention. The ECU 20 includes a housing 21 formed from plastic or metal by a conventional method, such as injection molding or die casting. The ECU 20 is shown in FIG. 2 as being removeably attached to a hydraulic valve body 14 by a plurality of fasteners 22. The housing 21 includes an integrally formed electrical connector 23 that provides electrical connections between the ECU 20 and wiring to the vehicle power supply, wheel speed sensors and other electrical components of the vehicle.

Figure 3:
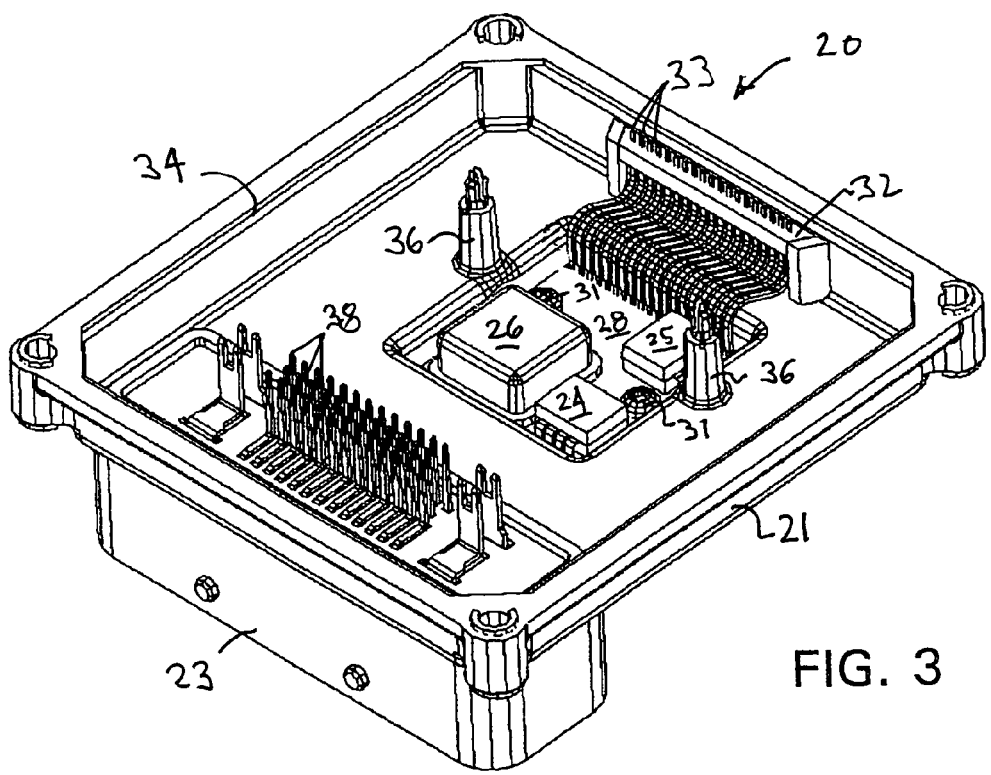
FIG. 3 is a perspective bottom view of the electronic control unit shown in FIG. 2.

As best seen in FIG. 3, which shows the inside of the ECU housing 21 as viewed from below the housing, the ECU 20 includes two acceleration sensors, 24 and 25 and one angular rate, or gyroscopic, sensor 26 mounted upon a circuit substrate 28. The circuit substrate 28 is disposed within a recess 30 formed in the upper surface of the ECU housing 21. The circuit substrate 28 is retained in the recess 30 by a pair of fasteners 31. The sensors 24, 25 and 26 are electrically connected to traces (not shown) disposed upon the circuit substrate 28. A section of flex circuit provides an electrical connection between the traces on the circuit substrate and a sensor connector 32. The sensor connector carries a plurality of connector pins 33. As shown in FIG. 3, a recess 34 extends along the sides of the housing 21 and a pair of supports 36 extend from the inner surface of the housing 21. An ECU circuit substrate (not shown) that carries the ECU microprocessor and other electronic components is received by the recess 34 and spaced apart from the housing 21 by the supports 36. A first plurality of vias formed through the ECU circuit substrate receive the sensor connector pins 33. Similarly, a second plurality of vias formed through the ECU circuit substrate receive a plurality of electrical connector pins 38. In the preferred embodiment, the pins 33 and 38 are wave soldered to electrical traces disposed upon the surface of the ECU circuit substrate. A plurality of solenoid coils are also soldered to corresponding vias formed through the ECU circuit substrate. Because the sides of the housing are relatively narrow, the solenoids extend below the ECU 20 and into a recess formed in the top surface of the hydraulic valve body 14.

In the preferred embodiment, the acceleration sensors 24 and 25 are positioned upon the circuit substrate 28 perpendicular to one another to sense vehicle acceleration and deceleration relative to two vehicle reference axes. While two acceleration sensors, 24 and 25 and one angular rate sensor 26 are shown in FIG. 3, it will be appreciated that the invention also may be practiced with more or less acceleration sensors and more angular rate sensors mounted within the ECU 20. Also, while the preferred embodiment has been illustrated and described with the acceleration sensors 24 and 25 being oriented upon the circuit substrate 28 perpendicular to one another, it will be appreciated that the invention also can be practiced with the acceleration sensors 24 and 25 oriented at a non-perpendicular angle to one another.

Figure 9:
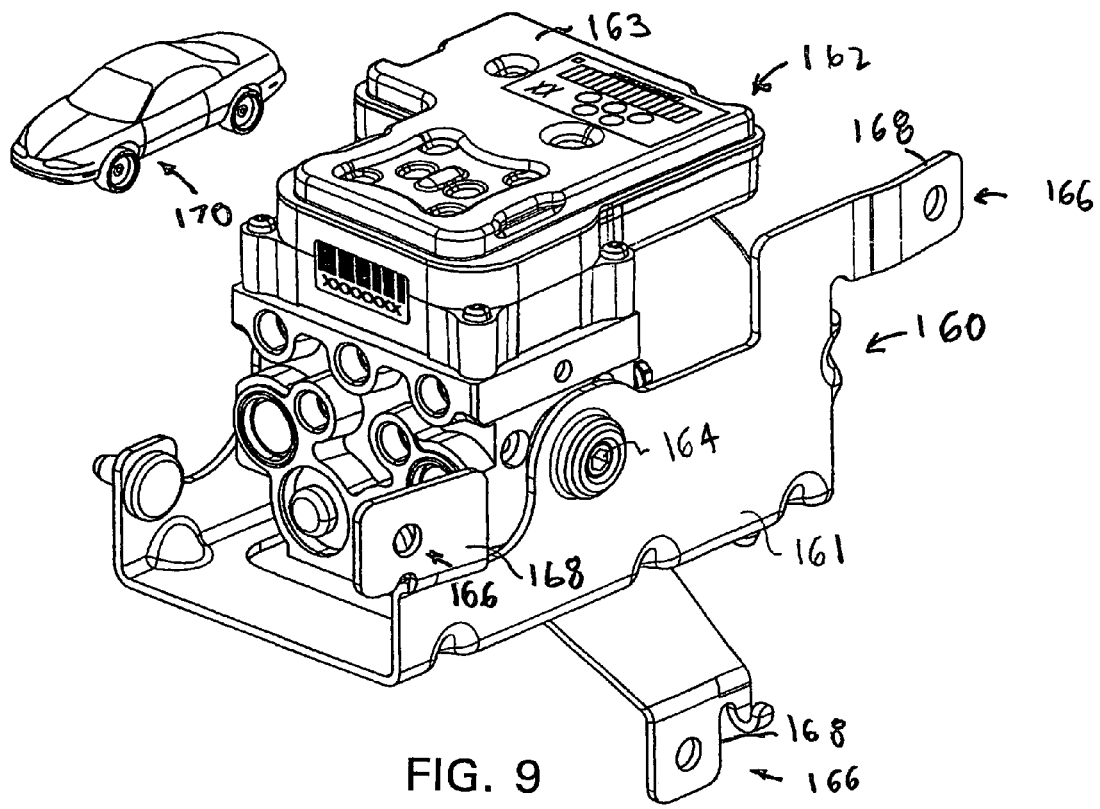
FIG. 9 is a perspective view of a electro-hydraulic control unit and mounting bracket assembly.

The combined ECU 20 and hydraulic valve body form a electro-hydraulic control unit that is mounted upon a vehicle (not shown). The electro-hydraulic control unit may either mounted directly upon the vehicle or, alternately, the electro-hydraulic control unit may be attached to a mounting bracket, as illustrated in FIG. 9. The bracket is then attached to the vehicle.

When the ECU 20 is mounted directly upon the vehicle, the mounting position may be selected such that each of motion sensors 24, 25 and 26 is aligned with the vehicle reference axis corresponding to the sensor. If it is not possible to mount the ECU 20 with the motion sensors aligned with the corresponding vehicle reference axis, the ECU algorithm will include a subroutine that compensates the sensor data to account for any deviation of the mounting orientation from the corresponding vehicle reference axis.

When the ECU 20 is attached to the vehicle by a mounting bracket, the mounting bracket can be shaped to align the motion sensors with the vehicle reference axes. If it is not possible to shape the mounting bracket to align the motion sensors with the reference axes, the ECU algorithm would then include a subroutine that compensates the sensor data to account for any deviation of the mounting orientation from the corresponding vehicle reference axis.

Alternatively, the circuit substrate 28 and the recess 30 may be positioned at an angle relative to the edges of the ECU 20 (not shown). Thus, the circuit substrate 31 may be effectively rotated about an axis perpendicular to the ECU housing 21 to further orient the motion sensors 22, 24 and 26 relative to their corresponding vehicle reference axes. Additionally, any combination of positioning of the circuit substrate within the ECU 20, mounting position of the ECU 20, mounting bracket shape and algorithm adjustment of the data can be used to orient the motion sensors.

Figure 4:
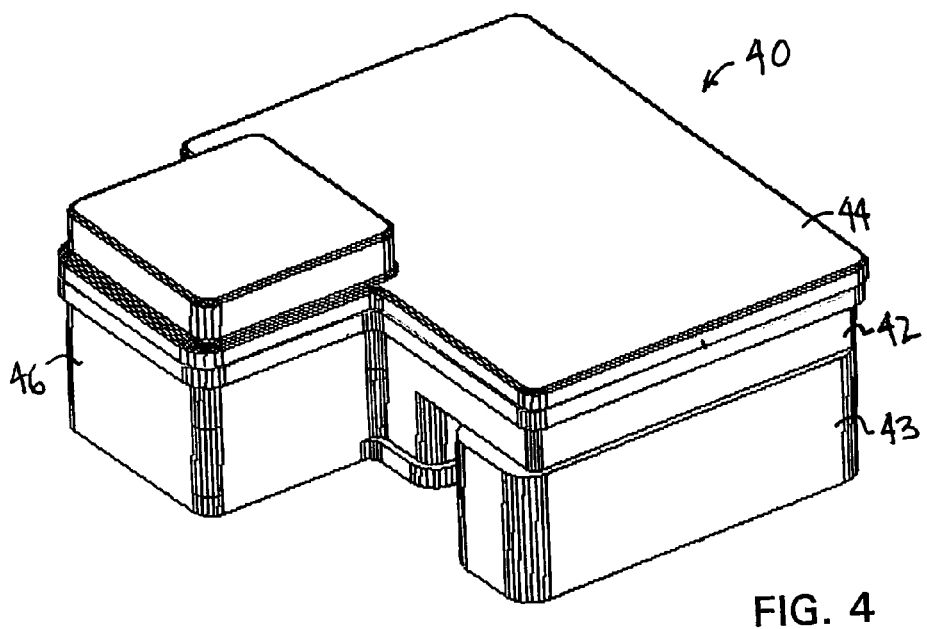
FIG. 4 is a perspective view of an alternate embodiment of the electronic control unit shown in FIG. 2.

An alternate embodiment of the invention is illustrated with the ECU 40 shown in FIG. 4. Components in FIG. 4 that are similar to components shown in the preceding drawings have the same numerical designators. The ECU 40 includes a housing 42 having deeper sides that allow solenoid coils attached to the ECU circuit substrate to be disposed within the housing 42. A separate cover 44 encloses the housing 42. The housing includes a sidewall extension 46 that receives a sensor assembly 48, as shown in the exploded view of the ECU 40 in FIG. 5. The sensor assembly 48 is mounted beside an ECU circuit substrate 50 and extends along a side of the ECU housing 42.

Figure 6:
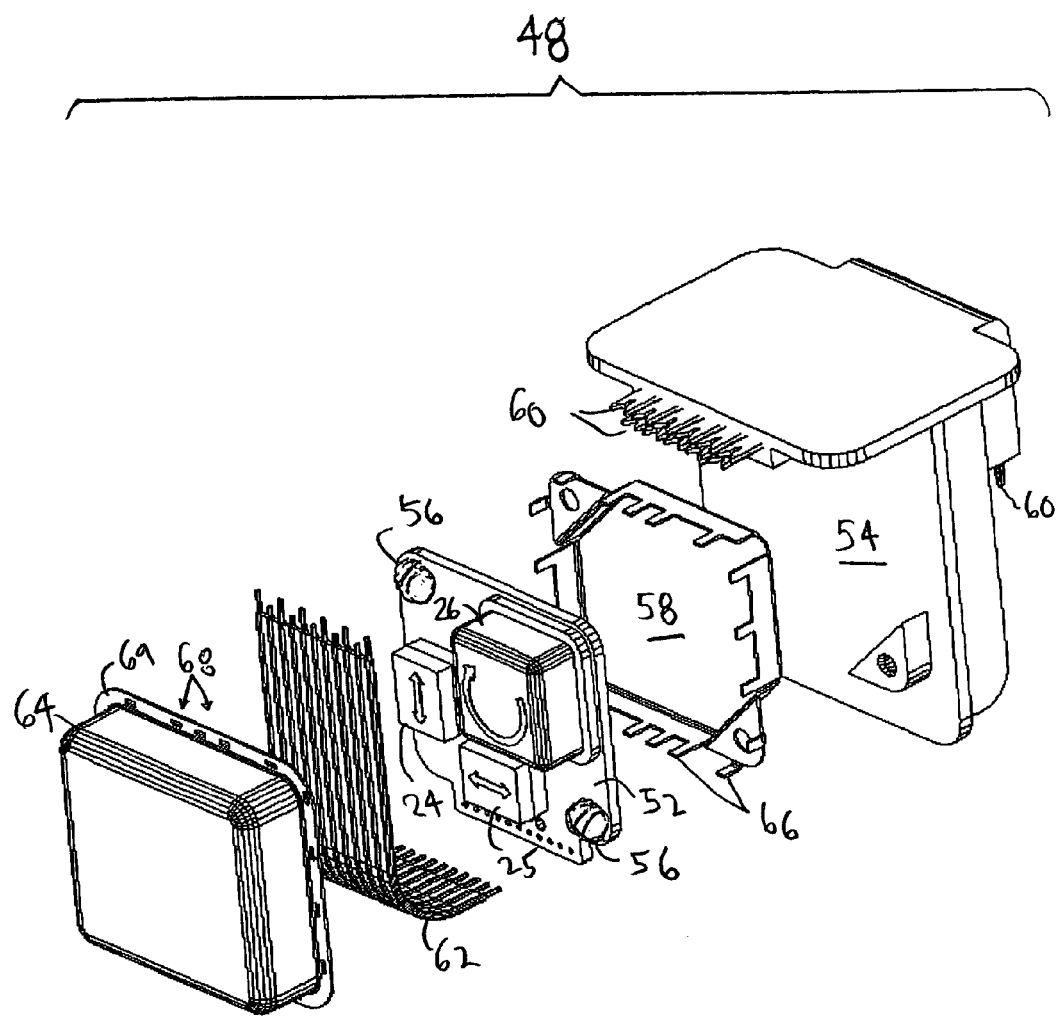
FIG. 6 is an exploded perspective view of a motion sensor assembly that is shown in FIG. 4.

An exploded view of the sensor assembly 48 is shown in FIG. 6. As in the first embodiment described above, the preferred embodiment of the sensor assembly 48 includes a pair of accelerometers 24 and 25 and an angular rate sensor 26. As above, the acceleration sensors 24 and 25 are positioned upon a circuit substrate 52 perpendicular to one another to sense vehicle acceleration and deceleration relative to two vehicle reference axes. While two acceleration sensors, 24 and 25 and one angular rate sensor 26 are shown in FIG. 6, it will be appreciated that the invention also may be practiced with more or less acceleration sensors and more angular rate sensors mounted within the ECU 40. Also, while the preferred embodiment has been illustrated and described with the acceleration sensors 24 and 25 being oriented upon the circuit substrate 52 perpendicular to one another, it will be appreciated that the invention also can be practiced with the acceleration sensors 24 and 25 oriented at an non-perpendicular angle to one another.

The sensor circuit substrate 52 carries electrical traces for the sensors and is attached to a generally L-shaped sensor leadframe 54 by a pair of fasteners 56. A shield base 58 is disposed between the sensor circuit substrate 52 and the leadframe 54. The fasteners 56 pass through apertures formed through the shield base 58 to secure the base 58 in position upon the leadframe 54. The leadframe 54 is formed from plastic injection molded over a plurality of electrical conductors 60. When assembled, a section of flex circuit 62 connects the traces on the sensor circuit substrate 52 to the leadframe conductors 60. A shield housing 64 encloses the substrate 52 and sensors 24, 25 and 26. A plurality of tabs 66 extend from the shield base and through slots 68 formed through a flange 69 formed along the bottom edge of the shield housing 64. The tabs 66 are bent over (not shown) to secure the housing 64 to the base 58. In the preferred embodiment, the base 58 and housing 64 are formed from an electrically conductive material, such as aluminum, to provide shielding of the sensors 24, 25 and 26 from electromagnetic radiation.

While a similar shield was not shown for the sensors carried in the ECU 20 described above and illustrated in FIGS. 2 and 3, it will be appreciated that such a shield can be included therein.

Similar to the ECU 20 described above, the combined ECU 40 and hydraulic valve body form an electro-hydraulic control unit that is mounted upon a vehicle (not shown). The electro-hydraulic control unit may either mounted directly upon the vehicle or, alternately, the electro-hydraulic control unit may be attached to a mounting bracket, as illustrated in FIG. 9. The bracket is then attached to the vehicle.

When the ECU 40 is mounted directly upon the vehicle, the mounting position may be selected such that each of motion sensors 24, 25 and 26 is aligned with the vehicle reference axis corresponding to the sensor. If it is not possible to mount the ECU 40 with the motion sensors aligned with the corresponding vehicle reference axis, the ECU algorithm will include a subroutine that compensates the sensor data to account for any deviation of the mounting orientation from the corresponding vehicle reference axis.

When the ECU 40 is attached to the vehicle by a mounting bracket, the mounting bracket can be shaped to align the motion sensors with the vehicle reference axes. If it is not possible to shape the mounting bracket to align the motion sensors with the reference axes, the ECU algorithm would then include a subroutine that compensates the sensor data to account for any deviation of the mounting orientation from the corresponding vehicle reference axis.

Alternatively, the motion sensors 22, 24 and 26 may be oriented upon the circuit substrate 52 at an angle relative to the edges of the substrate 52 that is different from that shown in FIG. 6. Thus, the sensors 22, 24 and 26 may be effectively rotated about an axis perpendicular to the leadframe base 54 to further orient the motion sensors 22, 24 and 26 relative to their corresponding vehicle reference axes. Additionally, any combination of positioning of the sensors upon the circuit substrate 52, mounting position of the ECU 40, mounting bracket shape and algorithm adjustment of the data can be used to orient the motion sensors relative to the reference axes.

Figure 7:
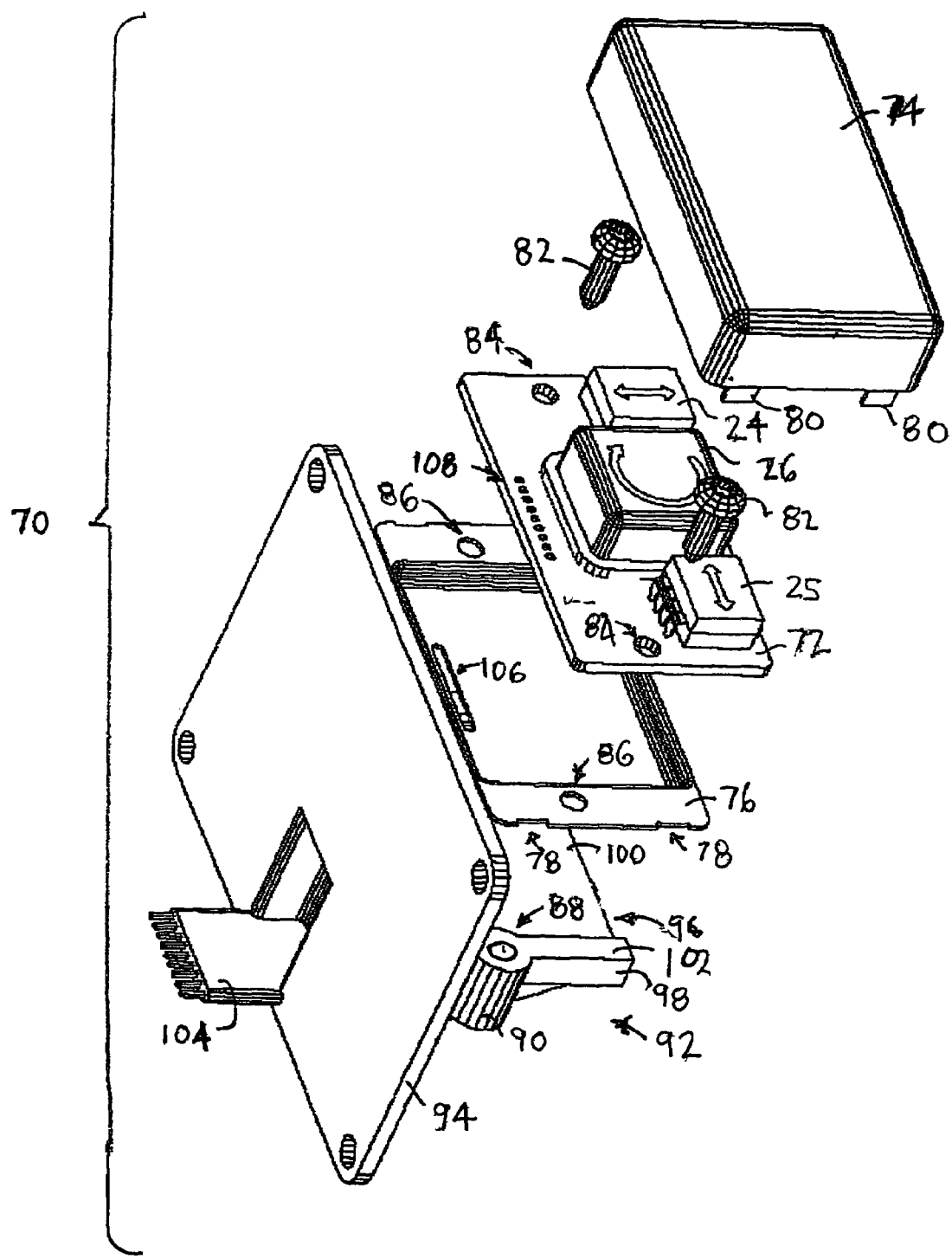
FIG. 7 is an exploded perspective view of an alternate embodiment of the motion sensor assembly that is shown in FIG. 6.

Another alternate embodiment of the sensor assembly is illustrated generally at 70 in FIG. 7. The alternate embodiment 70 includes two acceleration sensors 24 and 25 and one angular rate, or gyroscopic, sensor 26 mounted upon a circuit substrate 72. As above, the acceleration sensors 24 and 25 are positioned upon a circuit substrate 52 perpendicular to one another to sense vehicle acceleration and deceleration relative to two vehicle reference axes. While two acceleration sensors 24 and 25 and one angular rate sensor 26 are shown, it will be appreciated that the invention also may be practiced with more or less acceleration sensors and/or more angular rate sensors mounted within the ECU. Also, while the preferred embodiment has been illustrated and described with the acceleration sensors 24 and 25 being oriented upon the circuit substrate 72 perpendicular to one another, it will be appreciated that the invention also can be practiced with the acceleration sensors 24 and 25 oriented at an non-perpendicular angle to one another.

The circuit substrate 72 is enclosed by a cover housing 74 and cover base member 76. Recesses 78 formed along the edges of the base member 76 cooperate with corresponding tabs 80 that extend from the sides of the cover housing 74 to secure the cover housing 74 to the base member 76. In the preferred embodiment, the cover housing 74 and the cover base member 76 are formed from metal to provide shielding for the motion sensors from radio frequency interference.

A pair of threaded fasteners 82 extend through apertures 84 and 86 formed in the circuit substrate 72 and cover base member 76, respectively, and into bores 88 formed in bosses 90 formed upon a sensor assembly mounting bracket 92.

The mounting bracket 92 includes a base portion 94 and supporting portion 96. The supporting portion 96 includes a pair of arms 98 joined by a transverse member 100 that provides rigidity to the bracket 92. Each of the arms 98 carries one of the bosses 90. The faces 102 of the bosses 90 and bracket arms 98 support the circuit substrate 72 and cover components 74 and 76. The portion of each arm 98 behind the arm face 102 is formed at an angle to the base portion 94 to assure rigidity of the motion sensor mounting bracket 92. While the arm faces 102 are shown in FIG. 4 as being generally perpendicular to the surface of the bracket base portion 94, it will be appreciated that the invention also can be practiced with the arm faces forming a non-perpendicular angle with base portion surface.

A plurality of connector pins (not shown) extend from the transverse member 100 and are connected by conductive traces (also not shown) to an electrical connector 104 mounted upon the base portion 94. While the electrical connector 104 is shown as a separate component, it will be appreciated that the electrical connector also can be integrally formed with the mounting bracket 92. Additionally, instead of utilizing electrical traces, the bracket 92 also can be injection molded over a leadframe. Upon assembly of the motion sensors upon the mounting bracket 92, the electrical connector pins extend through a first plurality of apertures, or a slot, 106 formed through the cover base member 76 and also through a second plurality of apertures 108 formed through the circuit substrate 72. The ends of the connector pins are electrically connected to conductive traces (not shown) deposited upon the surface of the circuit substrate 72 by a conventional method, such as laser welding, soldering or press fitting.

The bracket 92 is attached to the ECU circuit substrate (not shown) by a conventional method, such as, for example, adhesive bonding or with fasteners. Alternately, the bracket can be frictionally retained by the electrical connector 104. The invention contemplates that the bracket 92 can be mounted with the edges of the base portion 94 either parallel to or not parallel to the edges of the ECU circuit board. As a result, the circuit substrate 76 and the motion sensors 24, 25 and 26 mounted thereon can be positioned at an angle relative to the edges of the ECU circuit board. Additionally, as described above, the faces 102 of the bracket arms 98 can form an angle with the surface of the bracket base portion 94, which also positions the circuit substrate 76 and the motion sensors 24, 25 and 26 mounted thereon at an angle relative to the surface of the ECU circuit board. The two degrees of freedom thus provided allow adjustment of the sensor positions relative to the three vehicle reference axes. Thus, it is possible to position the circuit substrate 76 upon the bracket 92 and the bracket upon the ECU substrate such that when the ECU is mounted upon a valve body and the resulting electrohydraulic control unit is mounted upon a vehicle, the motion sensors 24, 25 and 26 will be properly oriented with the three vehicle reference axes.

The invention also contemplates that a section of flex circuit (not shown) may be utilized to connect the electrical traces upon the circuit substrate 76 to the electrical connector 104.

Figure 8:
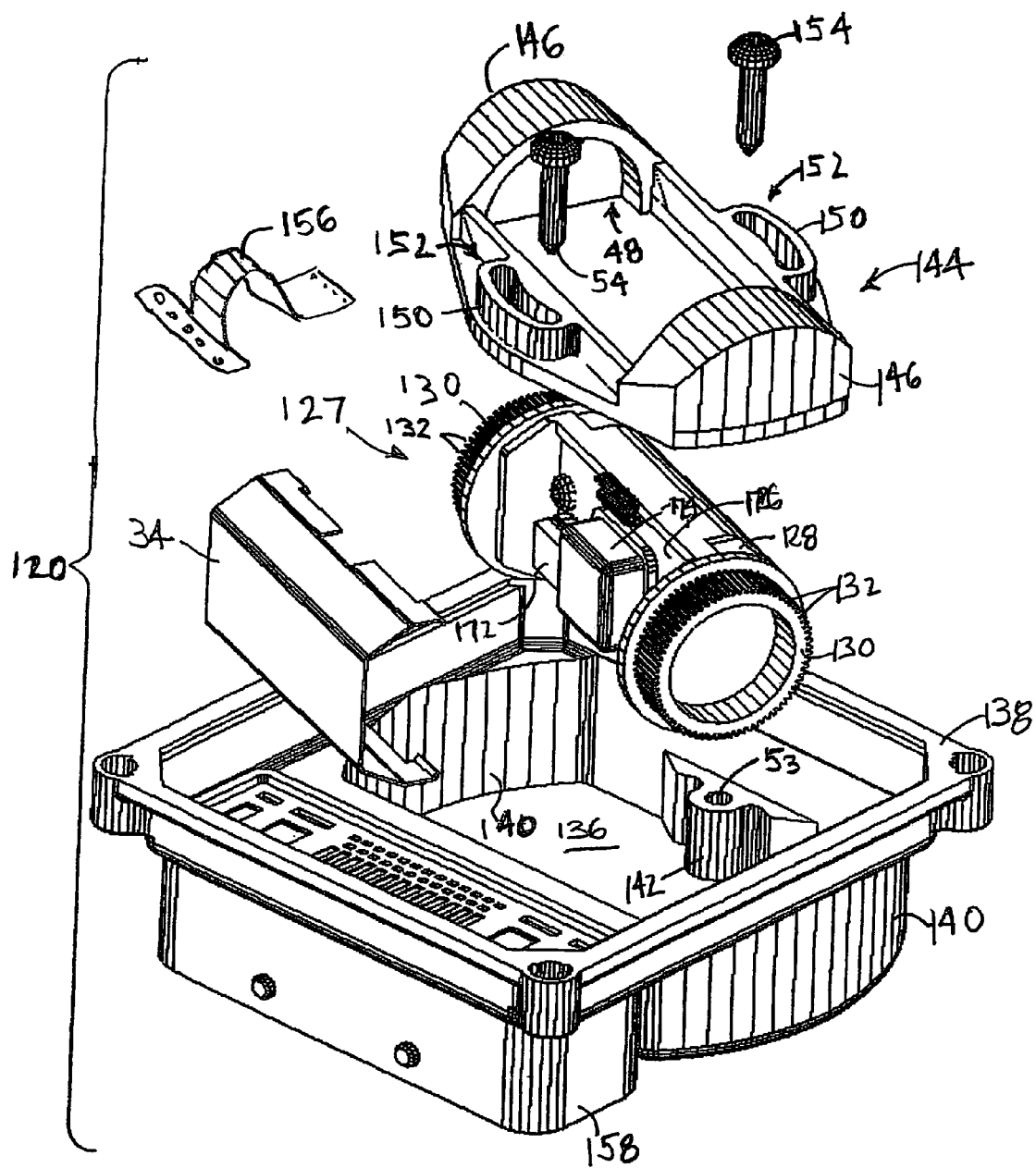
FIG. 8 is an exploded perspective view of another alternate embodiment of a motion sensor assembly in accordance with the invention.

Referring again to the drawings, there is illustrated generally at 120 in FIG. 8, an exploded view of another embodiment of an ECU that is in accordance with the invention. As shown in FIG. 8, the ECU 120 includes at least one acceleration sensor 122 and one angular rate, or gyroscopic, sensor 124 mounted upon a circuit substrate 126. While one only acceleration sensor 122 is shown, two or more acceleration sensors can be mounted upon the circuit substrate 126. Additionally, the invention also can be practiced with more two or more gyroscopic sensors mounted upon the circuit substrate 126. In the preferred embodiment, when two acceleration sensors are mounted upon the circuit substrate 126, they are perpendicular to one another to sense vehicle acceleration and deceleration relative to two vehicle reference axes. While the preferred embodiment for two acceleration sensors has described above with the acceleration sensors being oriented upon the circuit substrate 122 perpendicular to one another, it will be appreciated that the invention also can be practiced with the acceleration sensors oriented at an non-perpendicular angle to one another.

The circuit substrate 126 is mounted within a recess 127 formed in a generally cylindrical carrier 128. Annular positioning rings 130 are formed upon each end of the carrier 128. A plurality of ribs 132 are formed upon the surface of each of the annular positioning rings 130. As shown in FIG. 8, a cover 134 is attached to the carrier 128 and encloses the motion sensors 122 and 124. In the preferred embodiment, the cover 134 is stamped from a metal sheet and the carrier 128 is die cast from a metal to provide shielding for the motion sensors from electromagnetic radiation.

The motion sensors 122 and 124 and carrier 128 are disposed within a recess 136 formed in an ECU cover 138. The recess 136 has arcuate shaped walls 140 formed opposite from one another. Also, a pair of mounting bosses 142 (one shown) extend into the recess 136.

An adjustable positioning member 144 also is disposed within the recess 136. The member 144 has arcuate shaped ends 146 that correspond to the arcuate shaped recess walls 140. The positioning member 144 also has curved a recess 148 formed at each end thereof. The curved recesses 148 have ribs (not shown) formed upon the inner surfaces thereof. The recesses receive the carrier annular positioning rings 130 and the recess ribs cooperate with the carrier ribs 132 to lock the carrier 128 in a position relative to the axis of the carrier 128. A pair of flanges 150 extend from the sides of the positioning member 144. An arcuate slot 152 is formed through each of the flanges 150. A threaded fastener 154 extends through each of the flange slots 152 and into a corresponding bore 153 formed in one of the cover mounting bosses 142.

The arcuate shaped slots 152 allow rotational movement of the positioning member 144, and thus the carrier 128, about an axis that is perpendicular to the ECU cover 138. Once the desired orientation of the carrier 128 about the cover axis and relative to the ECU cover 139 is set, the fasteners 154 are tightened to retain the carrier 128 in position within the ECU cover 138. Additionally, as described above, the carrier 128 can be rotated within the positioning member 144 relative to the axis of the carrier 128. The two degrees of freedom thus provided allow adjustment of the orientation of the sensors relative to the three vehicle reference axes. Thus, it is possible to position the carrier 128 within the cover 138 such that when the ECU is mounted upon a valve body and the resulting electro-hydraulic control unit is mounted upon a vehicle, the motion sensors 122 and 124 will be properly oriented relative to with the three vehicle reference axes.

As shown in FIG. 8, a length of flex circuit 156 provides an electrical connection between the substrate 126 carrying the motion sensors 122 and 124 and an electrical connector 158 formed upon the ECU cover 138. The flex circuit 156 permits movement of the carrier 128 relative to the ECU cover 138.

In the preferred embodiment, a second substrate (not shown) is disposed within the ECU cover 138. The second substrate extends over the motion sensor carrier 128 and carries the electronic components for controlling the vehicle brakes when the brake control system is actuated. The second substrate carries conductive traces that are electrically connected to the pins extending from the connector 158. The ECU cover electrical connector 158 also provides an electrical connection with other wheel speed sensors, the vehicle power supply and other vehicle electrical systems.

A typical mounting bracket 160 is illustrated in FIG. 9. The bracket 160 has a generally U-shaped body 161 that cradles an electro-hydraulic valve unit 162. The electro-hydraulic valve unit 162 includes an ECU 163 that carries at least one accelerometer and at least one angular rate sensor. The valve unit 162 is secured to the bracket 160 by a plurality of threaded fasteners 164 (one shown). As shown in FIG. 9, the bracket includes three apertures 166 formed through tabs 168 that extend from the body of the bracket. The apertures 166 receive threaded fasteners (not shown) for securing the mounting bracket 160 to a vehicle. A small drawing of a vehicle 170 is included in FIG. 9 to illustrate the orientation of the bracket 160 to the vehicle 170 when mounted thereon. As described above, the bracket 160 provides a mounting orientation that aligns the motion sensors carried within the ECU 163 with the vehicle reference axes.

Figure 10:
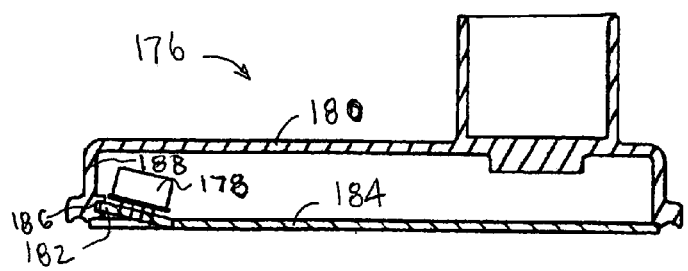
FIG. 10 is a sectional view of an electronic control unit that includes motion sensors in accordance with the invention.

The invention also contemplates additional alternate embodiments for mounting motion sensors within an ECU. A first additional alternate embodiment is shown generally at 176 in FIG. 10, where a motion sensor 178 is disposed within an ECU housing 180. The motion sensor 178 is mounted upon a tab 182 of a circuit substrate that extends at an angle from a main circuit substrate 184. In the preferred embodiment, the tab 182 is formed by slitting the main circuit substrate to form a projection that is heated to become pliable and then bent upward. The angle between the tab 182 and the main substrate 184 is selected to align the motion sensor 178 with the vehicle reference axes. An edge of the tab 182 extends into a notch 186 formed in an inner surface of an ECU housing wall 188. The notch 186 secures the tab 182 in position and thereby prevents vibration of the tab 182. While only one motion sensor 178 is shown in FIG. 10, it will be appreciated that the invention can be practiced with a plurality of motion sensors, to include accelerometers and/or angular rate sensors included within the ECU housing 180.

Figure 10A:
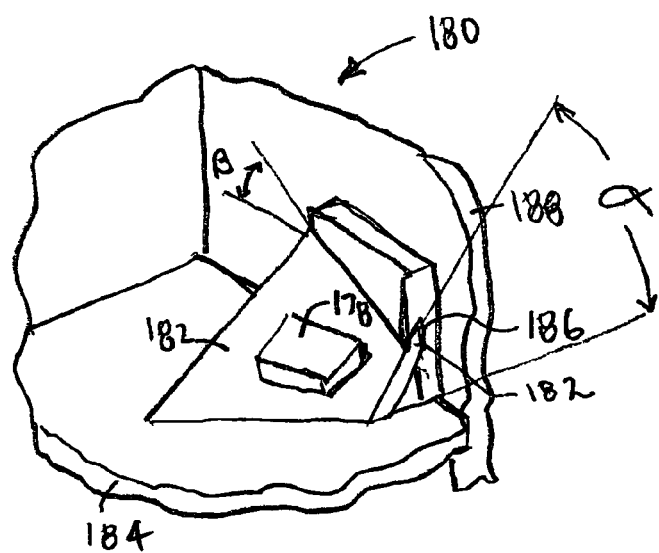
FIG. 10A is a partial perspective view of the control unit shown in FIG. 10 that illustrates the spatial orientation of the circuit board tab within the control unit housing.

The motion sensor 178 can be further spatially oriented as shown in FIG. 10A where the angle between the tab 182 and the main circuit substrate 184 is a first angle that is labeled α.

The invention also contemplates slitting the main circuit substrate to different depths such that, when the tab 182 is bent upward, the tab 182 is canted to define a second angle, that is labeled β in FIG. 10A, between the edge 182 of the tab 182 and the lower edge of the housing wall 188. When the control unit is installed upon a vehicle, the two degrees of freedom defined by the angles α and β allow positioning of the sensor 178 relative to the three reference axes of the vehicle.

Figure 11:
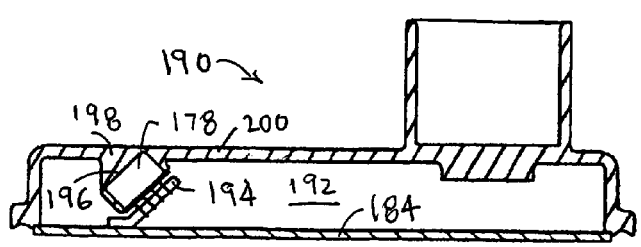
FIG. 11 a sectional view of an alternate embodiment of the electronic control unit shown in FIG. 10.

A second additional alternate embodiment is shown generally at 190 in FIG. 11, where a motion sensor 178 is disposed within an ECU housing 192. Components shown in FIG. 11 that are similar to components shown in preceding figures have the same numerical designators. The motion sensor 178 is mounted upon an angled support 194 formed from a circuit substrate material. The support 194 is attached a main circuit substrate 184 by a conventional process, such as, for example, with an adhesive. The support 194 is shaped to form an angle with the plane of the main substrate 184. The angle between the support 194 and the main substrate 184 is selected to align the motion sensor 178 with the vehicle reference axes. Additionally, the support 194 may be rotated about an axis that is perpendicular to the circuit substrate 184 before the support is secured to the substrate in order to provide a second degree of freedom for orienting the motion sensor 178 relative to the vehicle reference axes. The upper portion of the motion sensor 178 extends into a recess 196 formed in a boss 198 that extends from an inner surface an ECU housing cover 200. The recess 196 secures the tab sensor 178 in position with the ECU housing 192. While only one motion sensor 178 is shown in FIG. 11, it will be appreciated that the invention can be practiced with a plurality of motion sensors, to include accelerometers and/or angular rate sensors included within the ECU housing 190.

Figure 12:
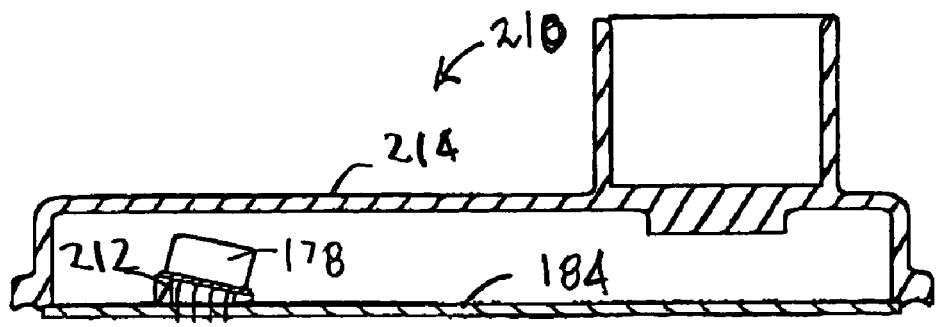
FIG. 12 another sectional view of an alternate embodiment of the electronic control unit shown in FIG. 10.

Another alternate embodiment is shown generally at 210 in FIG. 12, where components that are similar to components shown in preceding figures have the same numerical identifiers. As shown in FIG. 12, the motion sensor 178 is mounted upon a tapered support 212 that is attached to the main circuit substrate 184 by a conventional process, such as, for example, with an adhesive. The upper surface of the support 212 forms an angle with the plane of the main substrate 184 that is selected to align the motion sensor 178 with the vehicle reference axes. Additionally, the support 212 may be rotated about an axis that is perpendicular to the circuit substrate 184 before the support is secured to the substrate in order to provide a second degree of freedom for orienting the motion sensor 178 relative to the vehicle reference axes. As before, the circuit substrate 184 is carried by an ECU housing 214. Because the support 212 is solidly affixed to substrate it is not necessary to provide additional support with the housing 214 to prevent vibration of the motion sensor 178.

Figure 13:
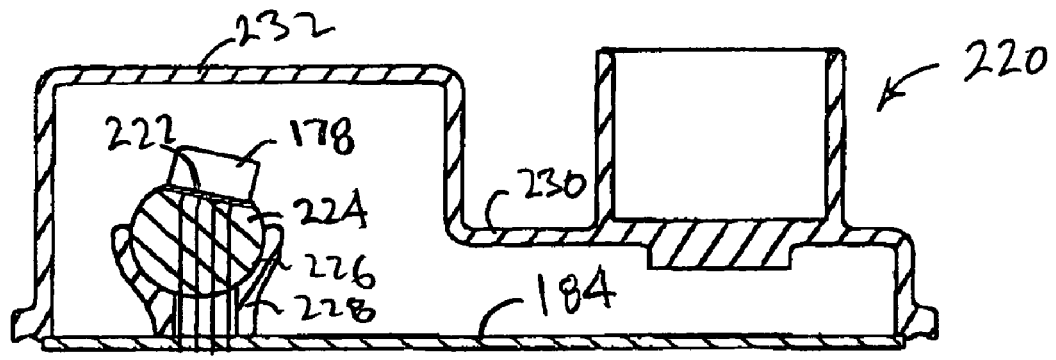
FIG. 13 another sectional view of an alternate embodiment of the electronic control unit shown in FIG. 10.

Another alternate embodiment is shown generally at 220 in FIG. 13, where components that are similar to components shown in preceding figures have the same numerical identifiers. As shown in FIG. 13, the motion sensor 178 is mounted upon a flatted surface 222 of a cylindrical shaped support 224. The cylindrical support 224 is rotatably received in a corresponding arcuate recess 226 formed in a hollow pedestal 228. The cylindrical support 24 is rotated within the recess 226 to tip the flattened support surface 222 relative to the main circuit substrate 184. The angle between the flattened surface 222 and the main substrate 184 that is selected to align the motion sensor 178 with the vehicle reference axes. Once the angle is adjusted, the cylindrical support 224 can be fixed within the recess 226 by a convention process, such as, for example, staking or application of an adhesive.

The pedestal 228 is attached to the main circuit substrate 184 by a conventional process, such as, for example, with an adhesive. Additionally, the pedestal 228 may be rotated about an axis that is perpendicular to the circuit substrate 184 before the being secured to the substrate 184 in order to provide a second degree of freedom for orienting the motion sensor 178 relative to the vehicle reference axes. As before, the circuit substrate 184 is carried by an ECU housing 230. The housing 230 includes a raised portion 232 that receives the sensor 178 and supporting structure. The motion sensor leads extend through the hollow portion of the pedestal 228 to the circuit substrate 184 where the leads are electrically connected to conductive traces. Because the motion sensor 178 is solidly supported by the pedestal 228 affixed to substrate it is not necessary to provide additional support with the housing 214 to prevent vibration of the motion sensor 178.

Figure 14:
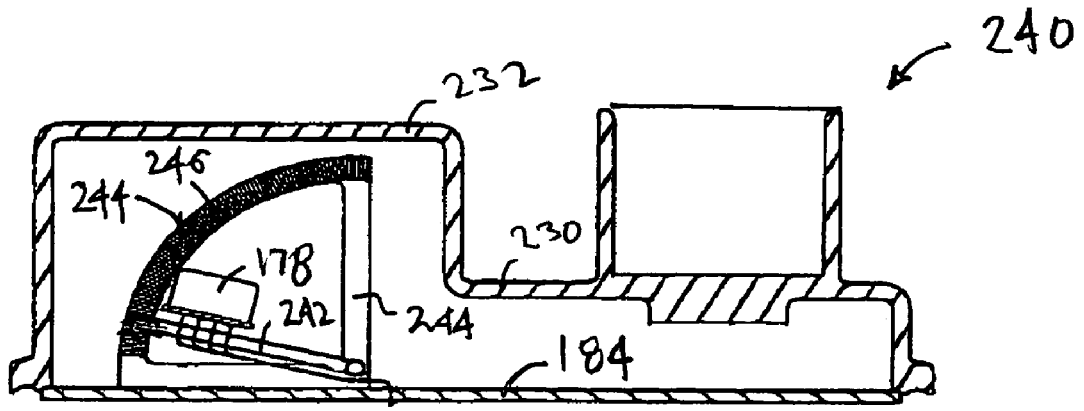
FIG. 14 another sectional view of an alternate embodiment of the electronic control unit shown in FIG. 10.

Another alternate embodiment is shown generally at 240 in FIG. 14, where components that are similar to components shown in preceding figures have the same numerical identifiers. As shown in FIG. 14, the motion sensor 178 is mounted upon a secondary circuit substrate 242 that is pivotally mounted upon a support structure 244. The secondary circuit board 242 extends between a pair of arcuate shaped arms (one shown) 244 that are included in the support structure 244. The arms 242 have a plurality of teeth 246 formed upon their inner surfaces that engage the edge of the secondary circuit substrate 242 and retain the substrate at an angle relative to the main circuit substrate 184. The angle between the secondary circuit board 242 and the main substrate 184 that is selected to align the motion sensor 178 with the vehicle reference axes. Once the angle is adjusted, the secondary circuit board 242 can be fixed in position between the arms 244 by a convention process, such as, for example, staking or application of an adhesive. Additionally, the support structure 244 may be rotated about an axis that is perpendicular to the circuit substrate 184 before the support structure is attached to the substrate in order to provide a second degree of freedom for orienting the motion sensor 178 relative to the vehicle reference axes. As before, the circuit substrate 184 is carried by an ECU housing 230. The housing 230 includes a raised portion 232 that receives the sensor 178 and supporting structure.

Figure 5:
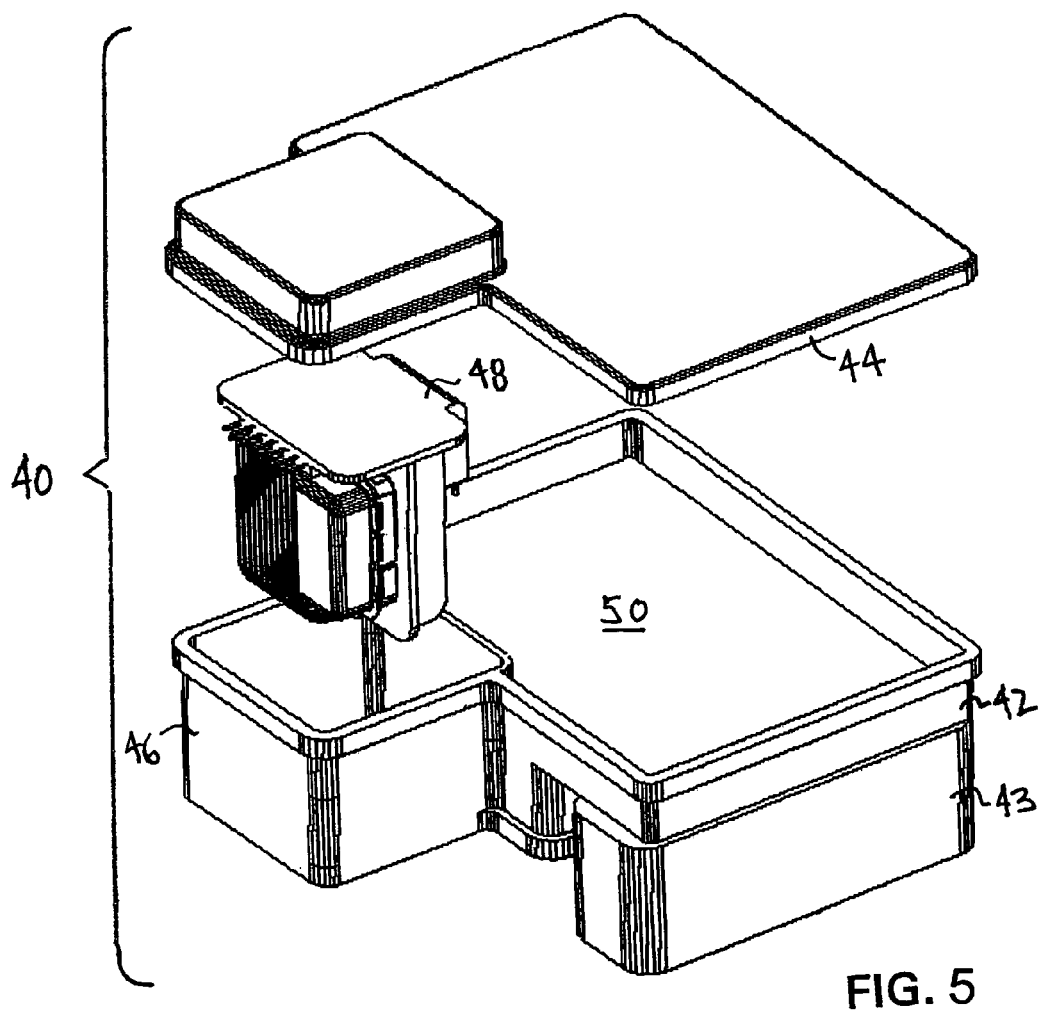
FIG. 5 is an exploded perspective view of the alternate embodiment of the electronic control unit shown in FIG. 4.
Figure 15:
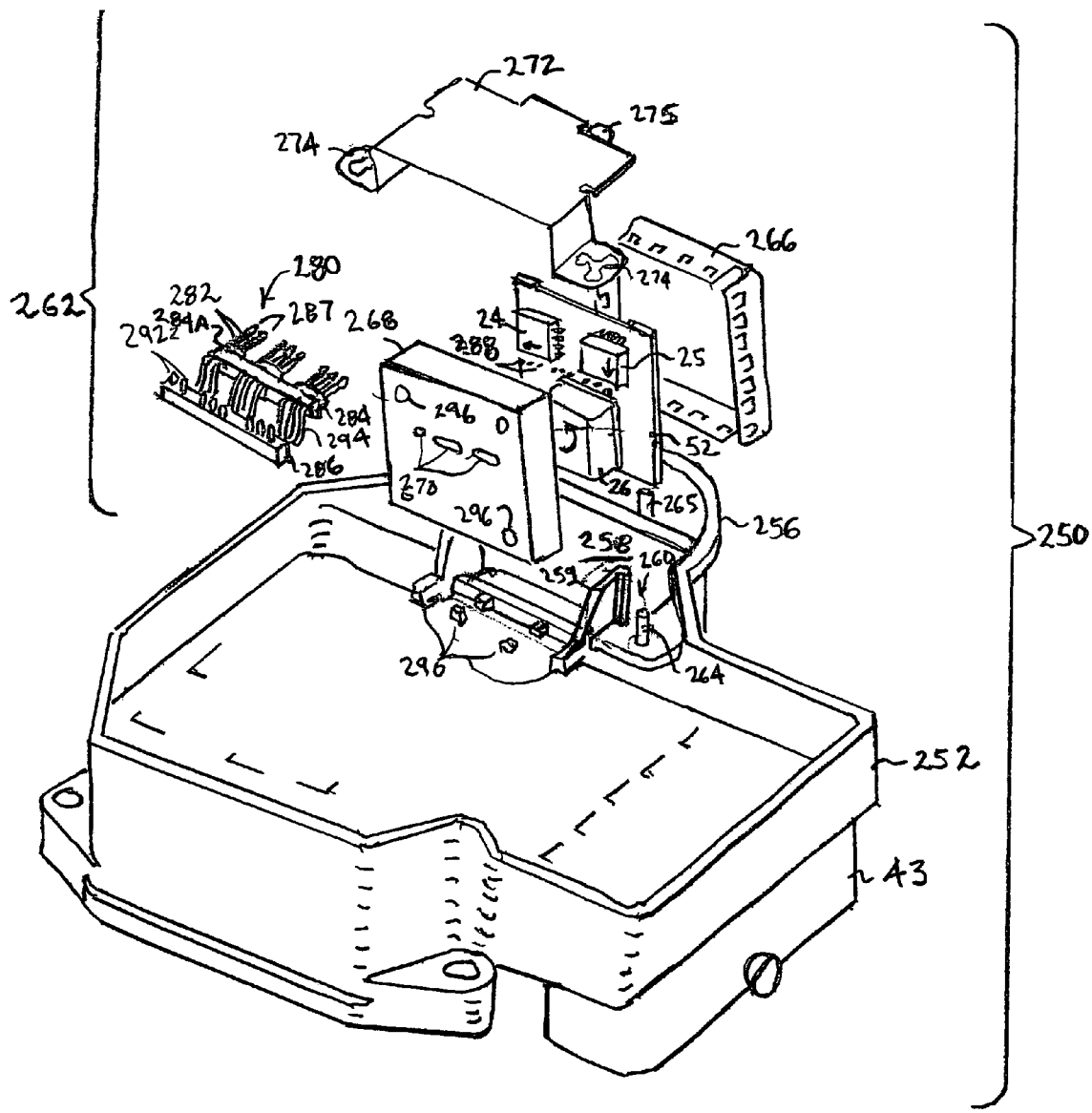
FIG. 15 is an exploded perspective view of an alternate embodiment of the control unit shown in FIG. 4.

An alternate embodiment of the Electronic Control Unit illustrated in FIGS. 4 through 6 is shown generally at 250 in the exploded view of FIG. 15. Components in FIG. 15 that are similar to components shown in the previous figures have the same numerical designators. The ECU 250 includes a housing 252 having deep sides that allow solenoid coils attached to the ECU circuit substrate to be disposed within the housing 252. In the preferred embodiment, as shown in FIG. 15, the ECU housing 252 is inverted and viewed from below. The housing includes a generally cylindrical sidewall extension 256 having a transverse member 258 extending thereacross. The transverse member 258 cooperates with a pair of positioning members 259 formed upon the main portion of the ECU housing 252 to define a recess 260 that receives a sensor assembly 262. A pair of mounting pins 264 extend upward from the housing 252 on both sides of the recess 260 while a third mounting pin 265 is located within the cylindrical sidewall extension 256.

As in the other embodiments described above, the preferred embodiment of the sensor assembly 262 includes a pair of accelerometers 24 and 25 and an angular rate sensor 26. As above, the acceleration sensors 24 and 25 are positioned upon a circuit substrate 52 perpendicular to one another to sense vehicle acceleration and deceleration relative to two vehicle reference axes. The sensor circuit substrate 52 carries electrical traces for the sensors 24, 25 and 26. While two acceleration sensors, 24 and 25 and one angular rate sensor 26 are shown in FIG. 15, it will be appreciated that the invention also may be practiced with more or less acceleration sensors and more angular rate sensors mounted within the ECU 250. Also, while the preferred embodiment has been illustrated and described with the acceleration sensors 24 and 25 being oriented upon the circuit substrate 52 perpendicular to one another, it will be appreciated that the invention also can be practiced with the acceleration sensors 24 and 25 oriented at an non-perpendicular angle to one another.

A shield housing 264 consisting of a base 266 and a cover 268 encloses the substrate 52 and sensors 24, 25 and 26. A plurality of tabs formed in the sides of base 266 are bent inwardly and cooperate with the sides of the cover 268 to secure the cover to the base. In the preferred embodiment, the base 266 and cover 268 are formed from an electrically conductive material, such as aluminum, to provide shielding of the sensors 24, 25 and 26 from electromagnetic radiation. Such electromagnetic radiation may be internally generated, as by the vehicle ignition system, or externally generated, as from cell phone towers. A plurality of apertures 270 are formed through the cover 268 and are sized to minimize the penetration of electromagnetic radiation through the shield housing 264.

Figure 16:
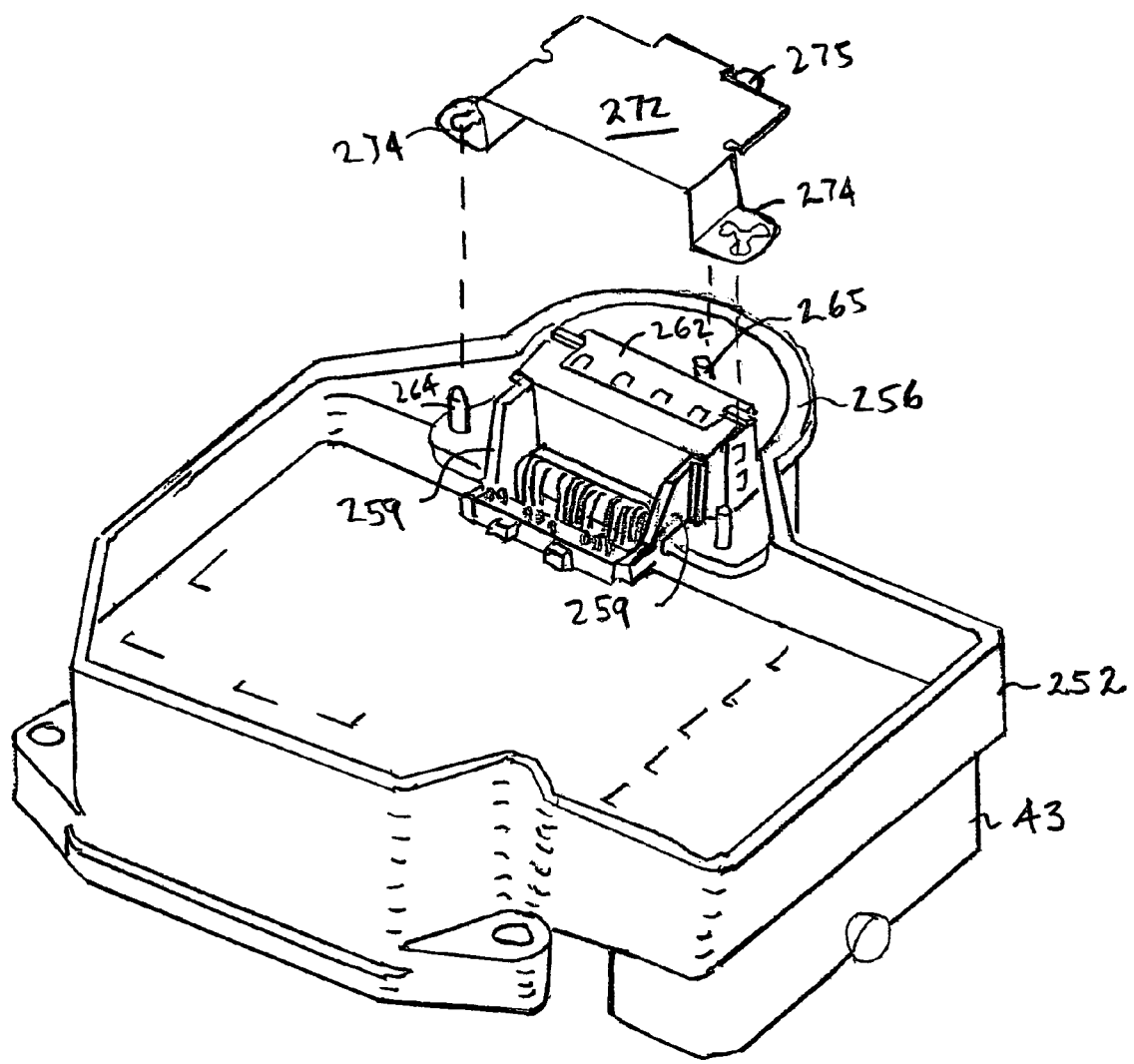
FIG. 16 is a perspective view of the control unit shown in FIG. 15 that is partially assembled.

As best seen in FIG. 16, which illustrates a partially assembled ECU 250, a securing clip 272 extends across top of the shield housing to retain the housing and sensors within the housing recess 260. A pair of apertures 274 formed through tabs extending from the ends of the clip 272 receive mounting pins 264. A third aperture is formed through a third tab 275 that extends from the rear of the clip 272 in FIG. 16. Each of the apertures includes a plurality of deformable tabs extending into the aperture. The deformable tabs cooperate with the mounting pins 264 and 265 to retain the clip 272 upon the ECU housing 252.

The sensor assembly 262 also includes an electrical connector 280 comprising a plurality of electrical connectors 282 and first and second support bodies 284 and 286. The first support body 284 has a plurality of bosses 284A formed thereon. Each of the bosses 284A corresponds to and is received by one of the apertures formed in the sensor housing cover 268. The electrical connectors 282 pass through corresponding apertures formed through the first support body 284 and the bosses 284A. The apertures and bosses in the first support body align the electrical connectors 282 with the apertures 270 formed through the sensor housing cover 268. In the preferred embodiment, the first ends of the electrical connectors are formed as compliant pin connectors 287 that are received by corresponding vias 288 in the sensor circuit substrate 52, thereby eliminating the need to solder the connectors to the traces formed upon the substrate. The second support body 286 is received and retained by a plurality of tabs 290 that extend upward from the ECU housing 252 in FIG. 15. The second support body vertically positions the second ends 292 of the electrical connectors 282 to be received by vias in the ECU circuit substrate (not shown). The mid-portions 294 of the electrical connectors 282 are formed in a generally "S" shape between the first and second support bodies 284 and 286. The S shape allows the electrical connectors to conform to the alignment tolerances of the ECU components.

While the transverse member 258 has been illustrated as being generally parallel to the adjacent ECU housing sidewall, it will be appreciated that the transverse member 258 and the positioning members 259 portion of the ECU also can be oriented to form an angle to the main portion of the ECU housing 252. As a result, the sensor circuit substrate 52 and the motion sensors 24, 25 and 26 mounted thereon can be positioned at an angle relative to the edges of the ECU circuit substrate and the ECU housing sidewall. Additionally, the sensors 24, 25 and 26 can be rotated about an axis perpendicular to the sensor substrate 52 and then affixed thereto to define an angle relative to the edges of the sensor substrate. The two degrees of freedom thus provided allow adjustment of the motion sensors relative to the three vehicle axes when the control unit is installed thereon.

Figure 17:
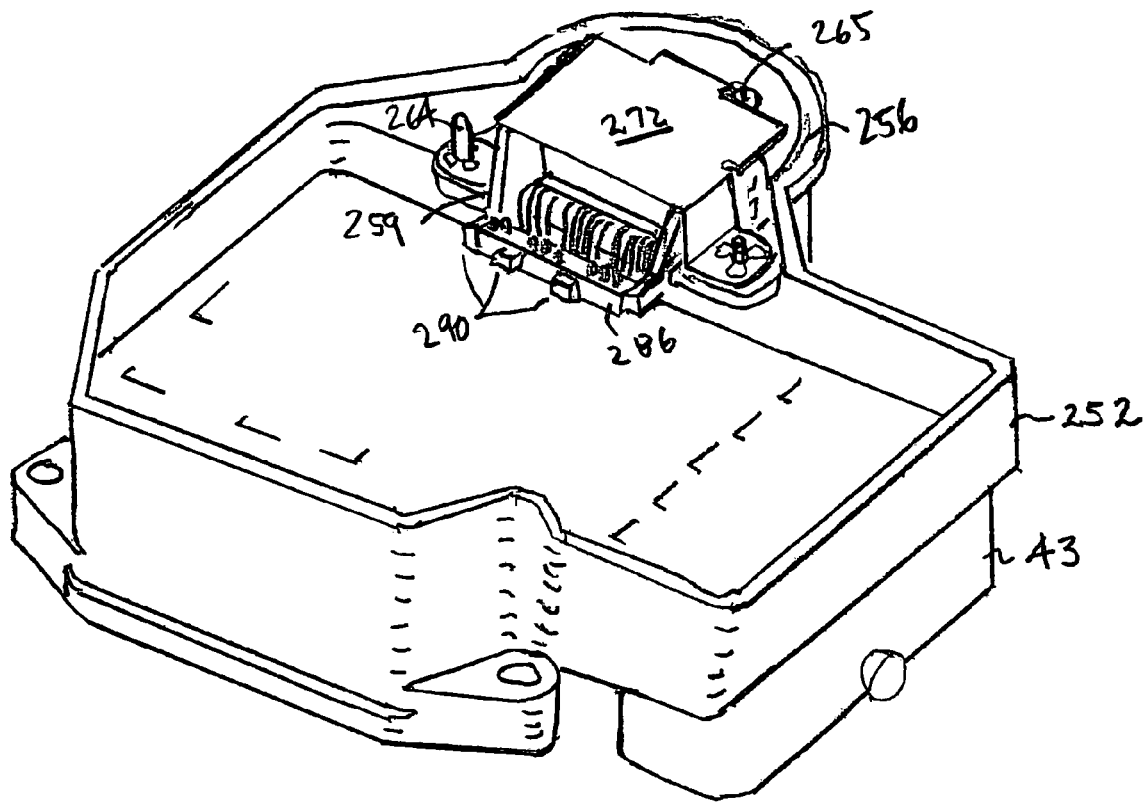
FIG. 17 is a perspective assembled view of the control unit shown in FIG. 15.

The assembly of the ECU 250 is illustrated by FIGS. 16 and 17. In FIG. 16, the sensor assembly 262 has been inserted into the recess 258 formed between the housing sidewall and the transverse member 258. In FIG. 17, the securing clip 272 has been attached to the mounting pins 264 and 265 to retain the sensor assembly 262 within the recess 258. In the preferred embodiment, a plurality of indentations 296 are formed in inside the surface of the sensor shield cover 268 and/or base 266 to extend outwardly threrefrom and provide an interference fit when the sensor assembly is inserted into the recess 258. Once the sensor assembly 262 is secured, the ECU circuit board (not shown) is inserted into the housing 252 and into electrical contact with the electrical connectors 292 to complete assembly of the ECU 250.

As described above, the preferred embodiment of the present invention integrates vehicle motion sensors into the ECU of an electro-hydraulic control unit for a vehicle conventional hydraulic brake system. However, it also will be appreciated that a similar electro-hydraulic control unit can be included in an electro-hydraulic brake system. Locating the motion sensors within the ECU eliminates wiring harnesses needed to connect remotely located sensors to the ECU and thus reduces manufacturing costs. Additionally, the ECU and sensors can be tested at the factory as a single unit before installation on a vehicle. Finally, maintenance is expected to be enhanced, since the ECU and sensors can be exchanged as a unit for a replacement unit. The defective unit can then be subsequently either trouble shot on the workbench at the repair facility or returned to the supplier on an exchange basis. Thus, vehicle downtime is expected to be reduced since it will not be necessary to trouble shoot, diagnose and repair the sensors and ECU separately while they are installed upon the vehicle.

The preferred embodiment of the invention has been described and illustrated with the ECU mounted upon a hydraulic valve body. However, it also is contemplated that the invention also can be practiced with the ECU, to include the motion sensors, mounted upon the vehicle remotely from the hydraulic valve body. For example, the ECU could be mounted in the passenger compartment while the hydraulic valve body would remain within the engine compartment or upon the vehicle chassis. In such a case, the solenoid valve coils would be mounted within a removeable Circuit Integrated Module (CIM) that is attached to the hydraulic valve body and electrically connected to the ECU. Such a free standing ECU is also contemplated for inclusion in a brake by wire system or electric brake system that would not include a hydraulic valve body.

Additionally, the invention also contemplates mounting the motion sensors in the electronic control unit for another system, such as, for example, an electric parking brake. The sensors would then be electrically connected through a CAN bus to the brake system electronic control unit.

As described above, it is contemplated that the ECU with motion sensors would be removable for servicing. The inclusion of motion sensors in the ECU is expected to reduce vehicle maintenance downtime since it will not be necessary to trouble shoot, diagnose and repair the sensors and ECU separately while they are installed upon the vehicle.

While multiple sensors have been described and illustrated as being separate components, it will be appreciated that the invention also can be practiced with multiple motion sense elements formed upon a single sensor die or with multiple dies mounted within a single electronic component package or case. For example, it is contemplated that the invention can be practiced with three acceleration sense elements contained within a single package mounted upon the circuit board included with the ECU. The acceleration sensors would measure vehicle acceleration with respect to all three vehicle reference axes. It is further contemplated that signal conditioning circuitry also could be included within the package. Similarly, it is contemplated that the invention can be practiced with three angular rate sensors contained within a single package that is mounted upon the circuit board included with the ECU. The package also could include signal conditioning circuitry. The angular rate sensors would measure vehicle yaw, pitch and roll for the vehicle. Finally, the invention also can be practiced with all the acceleration and angular rate sensors mounted within a single circuit package that also could include signal conditioning circuitry.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A control unit for a vehicle system, the vehicle having a plurality of reference axes, the control unit comprising:
    a control unit housing adapted to be mounted upon the vehicle;
    a first circuit substrate mounted within said housing, said first circuit substrate carrying electronic components for controlling the vehicle system;
    a second circuit substrate mounted upon a generally L-shaped leadframe, said second circuit substrate carrying conductive traces that electrically connect to said leadframe conductors, said leadframe being mounted upon and electrically connected to said first circuit substrate; and
    at least one motion sensor mounted upon said second circuit substrate and within said housing, said at least one motion sensor electrically connected through said second circuit substrate conductive traces to said electronic components for controlling the vehicle system, said at least one motion sensor operative to generate data concerning motion of the vehicle relative to at least one of the vehicle reference axes and to transmit said motion data to said electronic components.

2. The control unit according to claim 1 wherein said plurality of motion sensors include at least one accelerometer and at least one angular rate sensor.

3. The control unit .according to claim 2 wherein at least two of said motion sensors are mounted within a single electronic component package.

4. The control unit according to claim 3 wherein said electronic component package includes a signal conditioning circuit for conditioning said motion data generated by said motion sensors.

5. The control unit according to claim 4 further including a microprocessor mounted within said electronic package, said microprocessor operative to translate said motion data generated by said motion sensors to correct for the alignment of each of said motion sensors relative to said vehicle reference axes.

6. The control unit according to claim 4 further including a microprocessor mounted upon said first circuit substrate, said microprocessor operative to translate said motion data generated by said motion sensors to correct for the alignment of each of said motion sensors relative to said vehicle reference axes.

7. The control unit according to claim 2 wherein said second substrate is attached to said first circuit substrate with an edge of said second circuit substrate forming an angle with a wall of said control unit housing to further align said motion sensors with the vehicle reference axes.

8. The control unit according to claim 7 wherein said control unit housing has a recess formed in an inner surface thereof, said recess receiving a portion of at least one of said motion sensors whereby said motion sensor is supported by said control unit housing.

9. The control unit according to claim 2 wherein said second circuit substrate is mounted within a recess formed in said control unit housing and further wherein an electrical connector provides an electrical connection between said electrical traces on said second substrate and said electronic components carried upon said first circuit substrate.

10. The control unit according to claim 1 wherein said control unit housing is secured to a mounting bracket, said mounting bracket being adapted to be attached to the vehicle.

11. The control unit according to claim 10 wherein said mounting bracket is shaped to align said motion sensors with the vehicle reference axes.

12. The control unit according to claim 10 further including a hydraulic valve body, said control unit housing being mounted upon said hydraulic valve body, said hydraulic valve body being adapted to be connected to a vehicle hydraulic brake system, said combined control unit housing and hydraulic valve body being secured to said mounting bracket.

13. The control unit according to claim 12 wherein said mounting bracket is shaped to align said motion sensors with the vehicle reference axes.

14. The control unit according to claim 12 wherein said combined control unit housing and hydraulic valve body are included in a vehicle stability control system.

15. The control unit according to claim 12 wherein said combined control unit housing and hydraulic valve body are included in an electro-hydraulic brake system.

16. The control unit according to claim 10 wherein the control unit is included in an electric brake system.

17. The control unit according to claim 1 further including a microprocessor mounted upon said second circuit substrate, said microprocessor operative to translate said motion data generated by said at least one motion sensor to correct for the alignment of each of said motion sensors relative to said vehicle reference axes.

18. A control unit for a vehicle system, the vehicle having a plurality of reference axes, the control unit comprising:
 a control unit housing adapted to be mounted upon the vehicle;
 a first circuit substrate within said housing, said first circuit substrate carrying electronic components for controlling the vehicle system;
 a second circuit substrate, said second circuit substrate being mounted within said control unit housing and upon a generally cylindrical base, said cylindrical base being rotatably mounted upon said control unit housing and rotatable relative to said control unit housing, said second circuit substrate having electrical traces formed thereon; and
 a plurality of motion sensors that includes at least one accelerometer and at least one angular rate sensor, said motion sensors being electrically connected to said electronic components for controlling the vehicle system, said motion sensors operative to generate data concerning motion of the vehicle relative to the reference axes and to transmit said motion data to said electronic components, said motion sensors mounted upon said second circuit substrate with said second circuit electrical traces connected to said motion sensors and with said cylindrical base being rotated relative to said control unit housing to align said motion sensors with the vehicle reference axes.

19. The control unit according to claim 18 wherein the control unit is a first control unit for controlling a first vehicle system and further wherein a second control unit for controlling a second vehicle system is connected to said first control unit, said first control unit being operative to transmit vehicle motion data to said second control unit.

20. The control unit according to claim 18 wherein the control unit is adapted to be mounted within a vehicle engine compartment.

21. The control unit according to claim 18 wherein the control unit is adapted to be mounted upon a vehicle chassis.

22. The control unit according to claim 18 wherein the control unit is adapted to be mounted within a vehicle passenger compartment.

23. The control unit according to claim 18 wherein the vehicle reference axes are perpendicular to one another.

24. The control unit according to claim 18 wherein said generally cylindrical base is mounted with a positioning member, said positioning member being mounted within a recess formed in said control unit housing and movable within said recess relative to the walls of said control unit housing to further align said motion sensors with the vehicle reference axes.

25. The control unit according to claim 24 further including a microprocessor mounted upon said second circuit substrate, said microprocessor operative to translate said motion data generated by said motion sensors to correct for the alignment of each of said motion sensors relative to said vehicle reference axes.

26. A control unit for a vehicle system, the vehicle having a plurality of reference axes, the control unit comprising:
 a control unit housing adapted to be mounted upon the vehicle;
 a first circuit substrate mounted within said housing, said first circuit substrate carrying electronic components for controlling the vehicle system;
 a second circuit substrate, said second circuit substrate being carried by a generally cylindrical base, said cylindrical base being rotatablly mounted upon a pedestal, said pedestal being mounted upon said first circuit substrate with said cylindrical base being rotatable relative to said control unit housing; and
 a plurality of motion sensors that includes at least one accelerometer and at least one angular rate sensor, said motion sensors being electrically connected to said electronic components for controlling the vehicle system, said motion sensors operative to generate data concerning motion of the vehicle relative to the reference axes and to transmit said motion data to said electronic components, said motion sensors mounted upon said second circuit substrate with said cylindrical base being rotated relative to said control unit housing to align said motion sensors with the vehicle reference axes.

27. The control unit according to claim 26 wherein said pedestal is mounted upon said first circuit substrate such that said cylindrical base forms an angle relative to a wall of said control unit housing to further align said motion sensors with the vehicle reference axes.

28. A control unit for a vehicle system, the vehicle having a plurality of reference axes, the control unit comprising:
a control unit housing adapted to be mounted upon the vehicle;
a circuit substrate mounted within said housing, said circuit substrate carrying electronic components for controlling the vehicle system;
a wedge shaped support base, said support base being mounted upon said circuit substrate; and
a plurality of motion sensors that includes at least one accelerometer and at least one angular rate sensor, said motion sensors being electrically connected to said electronic components for controlling the vehicle system, said motion sensors operative to generate data concerning motion of the vehicle relative to the reference axes and to transmit said motion data to said electronic components, said motion sensors mounted upon said surface of said wedge shaped support base with said surface of said wedge shaped support base forming an angle with said circuit substrate to align said motion sensors with the vehicle reference axes.

29. The control unit according to claim 28 wherein said wedge shaped support base is mounted upon said circuit substrate with a side of said support base substrate forming an angle with a wall of said control unit housing to further align said motion sensors with the vehicle reference axes.

30. The control unit according to claim 29 wherein said control unit housing has a recess formed in an inner surface thereof, said recess receiving a portion of at least one of said motion sensors whereby said motion sensor is supported by said control unit housing.

31. A control unit for a vehicle system, the vehicle having a plurality of reference axes, the control unit comprising:
a control unit housing adapted to be mounted upon the vehicle;
a first circuit substrate mounted within said housing, said first circuit substrate carrying electronic components for controlling the vehicle system;
a second circuit substrate, said second circuit substrate being mounted within a recess formed in said control unit housing, said second circuit substrate having electrical traces formed thereon and being pivotally attached to said first circuit substrate with the plane of said second circuit substrate forming an angle with said first circuit substrate to align said motion sensors with the vehicle reference axes;
an electrical connection between said electrical traces on said second substrate and said electronic components carried upon said first circuit substrate; and
a plurality of motion sensors that includes at least one accelerometer and at least one angular rate sensor mounted upon said second circuit substrate, said motion sensors being electrically connected to said electronic components for controlling the vehicle system, said motion sensors operative to generate data concerning motion of the vehicle relative to the reference axes and to transmit said motion data to said electronic components, said motion sensors mounted upon said second circuit substrate with said second circuit electrical traces connected to said motion sensors, said pivotal attachment being mounted upon said first circuit substrate with a side of said second circuit substrate forming an angle with a wall of said control unit housing to further align said motion sensors with the vehicle reference axes.

32. A control unit for a vehicle system, the vehicle having a plurality of reference axes, the control unit comprising:
a control unit housing adapted to be mounted upon the vehicle;
a first circuit substrate mounted within said housing, said first circuit substrate carrying electronic components for controlling the vehicle system;
a second circuit substrate, said second circuit substrate being mounted within a recess formed in said control unit housing, said second circuit substrate having electrical traces formed thereon;
an electrical connection between said electrical traces on said second substrate and said electronic components carried upon said first circuit substrate;
a plurality of motion sensors that includes at least one accelerometer and at least one angular rate sensor, said motion sensors being electrically connected to said electronic components for controlling the vehicle system, said motion sensors operative to generate data concerning motion of the vehicle relative to the reference axes and to transmit said motion data to said electronic components, said motion sensors mounted upon said second circuit substrate with said second circuit electrical traces connected to said motion sensors; and
a shielding housing formed from an electrically conductive material, said shielding housing also being received by said control unit housing recess and enclosing said motion sensors whereby said motion sensors are shielded from electromagnetic radiation.

33. The control unit according to claim 32 further including a microprocessor mounted upon said second circuit substrate, said microprocessor operative to translate said motion data generated by said motion sensors to correct for the alignment of each of said motion sensors relative to said vehicle reference axes.

34. The control unit according to claim 32 wherein said recess in said control unit housing may be oriented at an angle with respect to an edge of said first circuit board and further wherein said motion sensors may be oriented at an angle with respect to the edges of said second circuit board whereby said motion sensors are aligned with the vehicle reference axes.

35. The control unit according to claim 32 wherein said electrical connector includes a plurality of electrical conductors having a generally S-shape whereby the electrical connector can accommodate dimensional tolerances of components with the control unit.

36. The control unit according to claim 32 wherein said shielding housing is retained within said control housing recess by a securing clip that engages a plurality of mounting posts formed upon said control unit housing.

37. The control unit according to claim 36 wherein said control housing includes an extension formed in a sidewall thereof, said sidewall extension defining said recess.

38. The control unit according to claim 37 wherein said sidewall extension has a generally cylindrical shape and further wherein a transverse member extends across said cylinder to define said recess.

39. The control unit according to claim 38 further including at least one positioning member formed in said control unit housing opposite from said transverse member, said positioning member cooperating with said transverse member to define said recess.

* * * * *